Feb. 8, 1938.   C. J. CLARK   2,107,690
WINDMILL
Filed Jan. 7, 1937   7 Sheets-Sheet 1

Inventor
*C. J. Clark*

By *Clarence A. O'Brien*
*Hyman Berman*
Attorneys

Feb. 8, 1938.  C. J. CLARK  2,107,690
WINDMILL
Filed Jan. 7, 1937  7 Sheets-Sheet 2

Inventor
C. J. Clark
By Clarence A. O'Brien
Hyman Berman
Attorneys

Feb. 8, 1938.　　　　C. J. CLARK　　　　2,107,690
WINDMILL
Filed Jan. 7, 1937　　　7 Sheets-Sheet 4

Inventor
C. J. Clark
By Clarence A. O'Brien
Hyman Berman
Attorneys

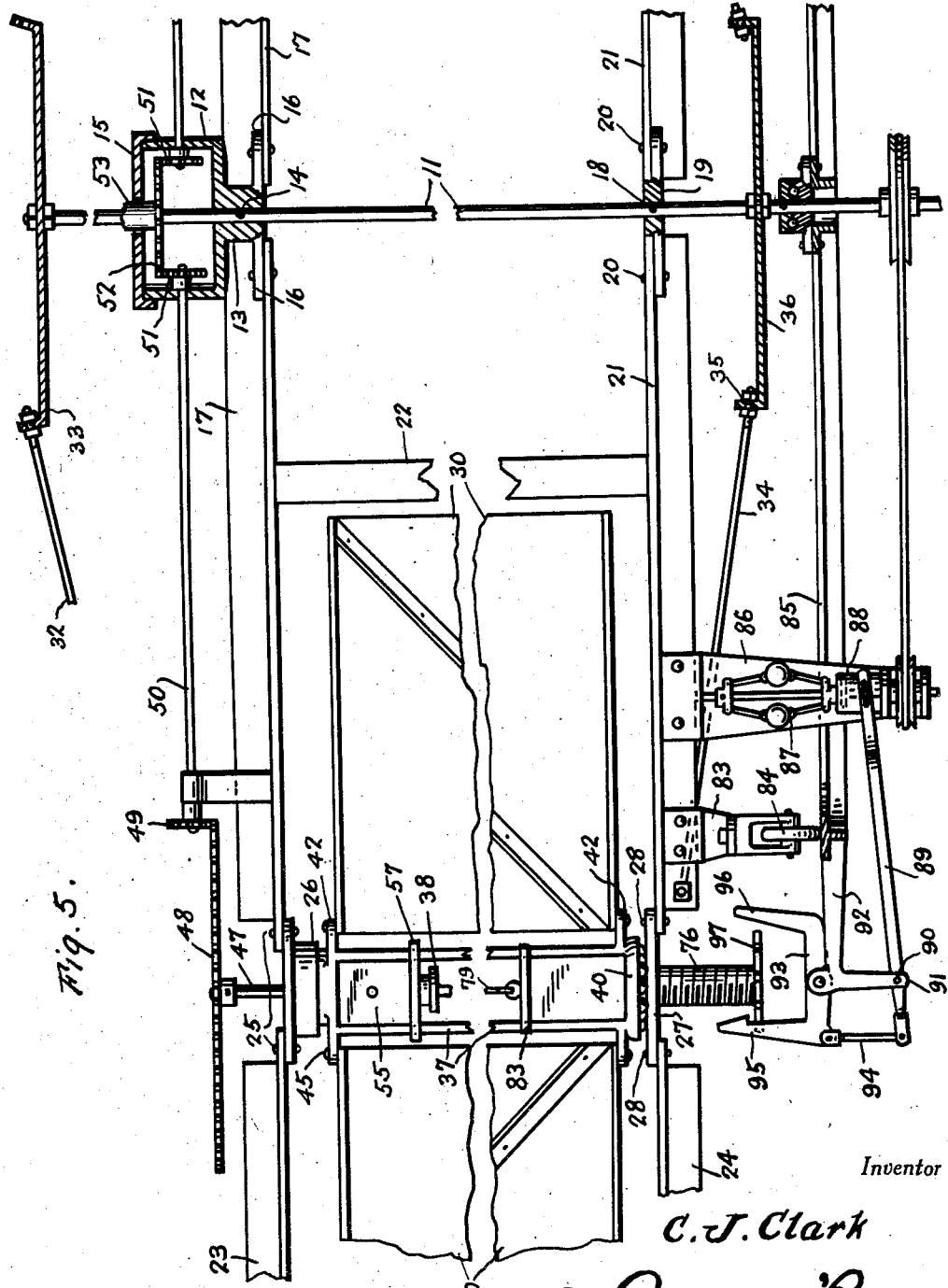

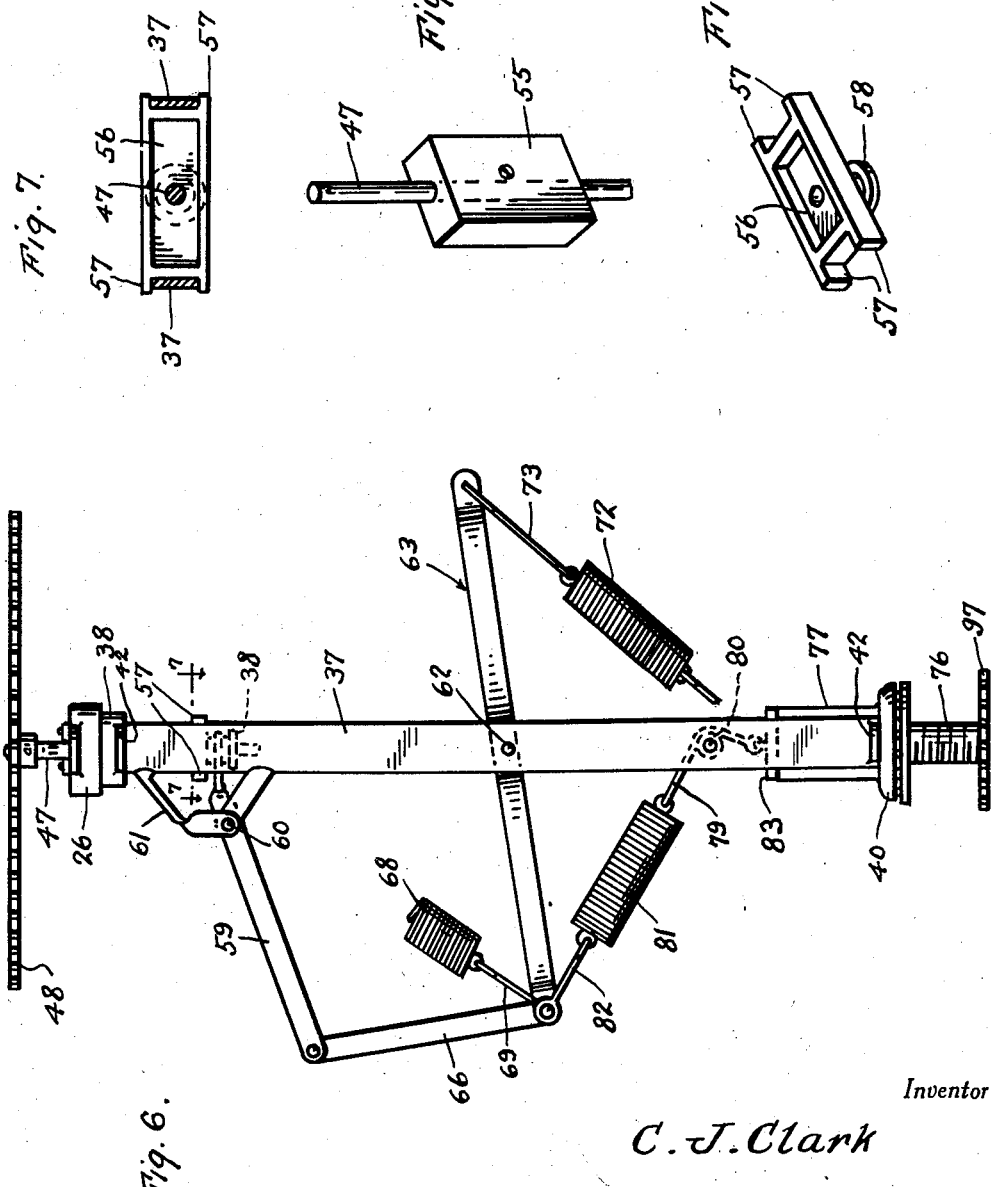

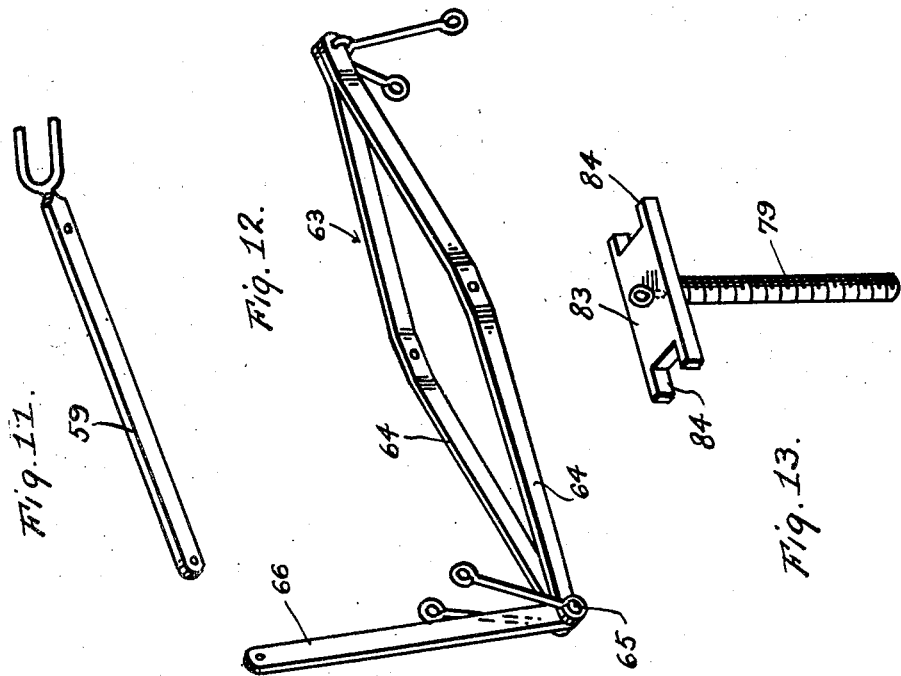
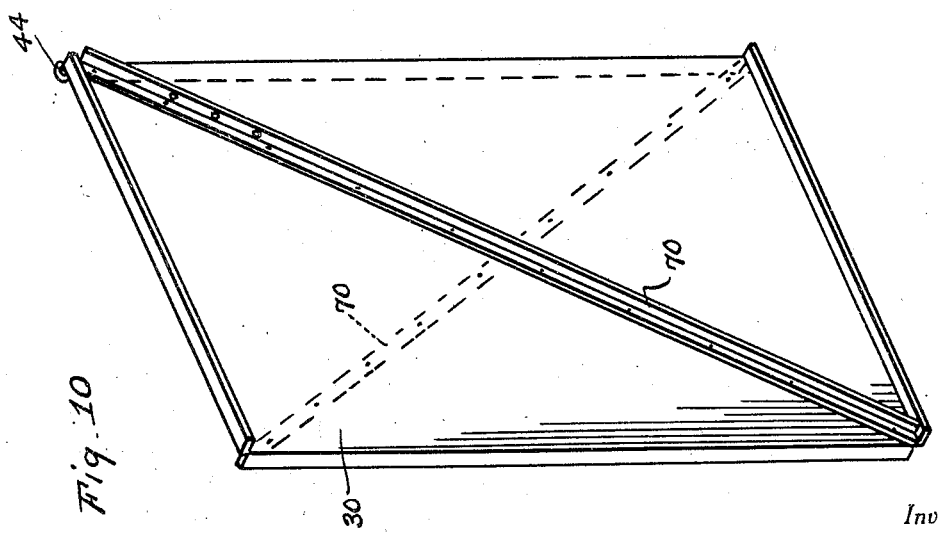

Patented Feb. 8, 1938

2,107,690

UNITED STATES PATENT OFFICE 2,107,690

WINDMILL

Claude J. Clark, Young, Ariz.

Application January 7, 1937, Serial No. 119,490

4 Claims. (Cl. 170—25)

This invention relates to windmills, and an object of the invention is to provide a windmill which is automatically controlled and involves a rotating power member having pivoted blades or wings, together with means for presenting the windmill blades or wings at the proper angle to the wind, together with means to be actuated by a storm or high velocity of wind to release the wings or blades, whereby they will be presented edgewise to the wind and thus render the windmill safe from damage under such conditions.

The invention together with its objects and advantages will be best understood from a study of the following description taken in connection with the accompanying drawings wherein:—

Figure 5 is an enlarged detail fragmentary view, partly in section and partly in elevation showing governor means for releasing the wings.

Figure 6 is a side or edge elevational view of a wing assembly with the wings or vane at the near side removed.

Figure 7 is a sectional view taken substantially on the line 7—7 of Figure 6.

Figure 8 is a perspective view of a shaft and fixed clutch member associated therewith.

Figure 9 is a perspective view of a slidable clutch element.

Figure 10 is a perspective view of a wing or vane.

Figure 11 is a perspective view of a fork.

Figure 12 is a perspective view of a rocker arm assembly; and

Figure 13 is a perspective view of a screw member.

Figure 1:
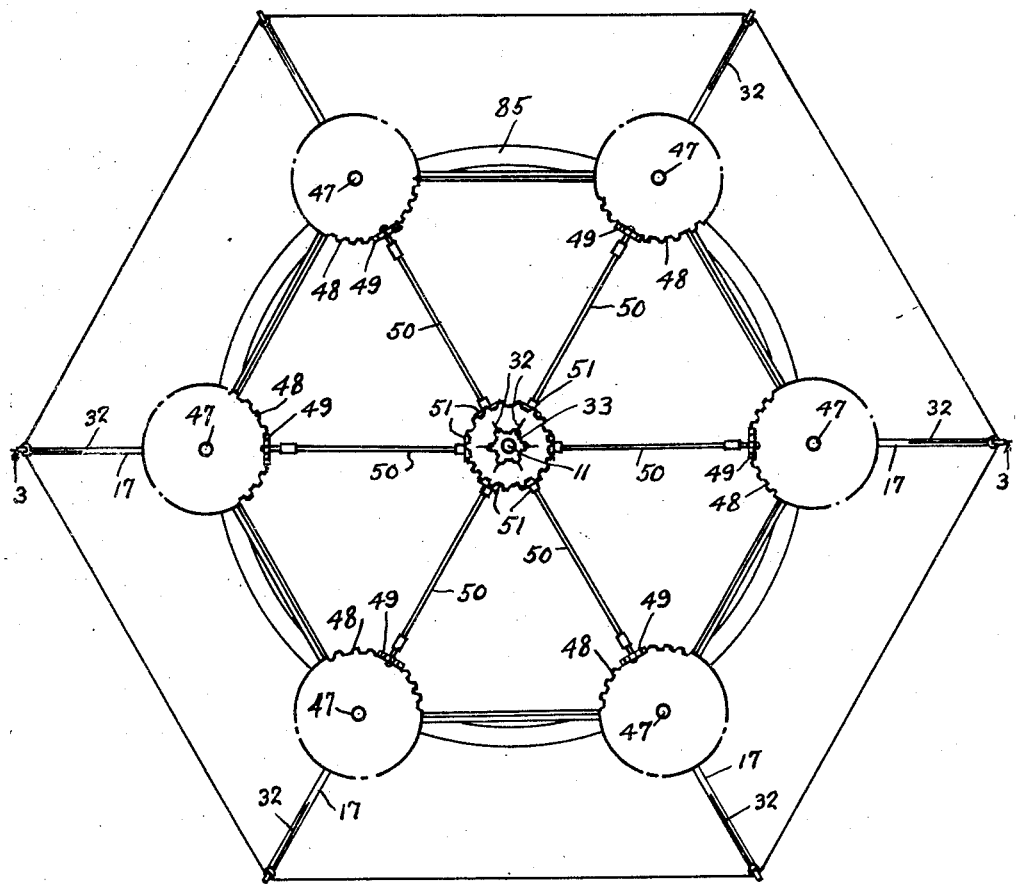
Figure 1 is a top plan view of the windmill.
Figure 2:
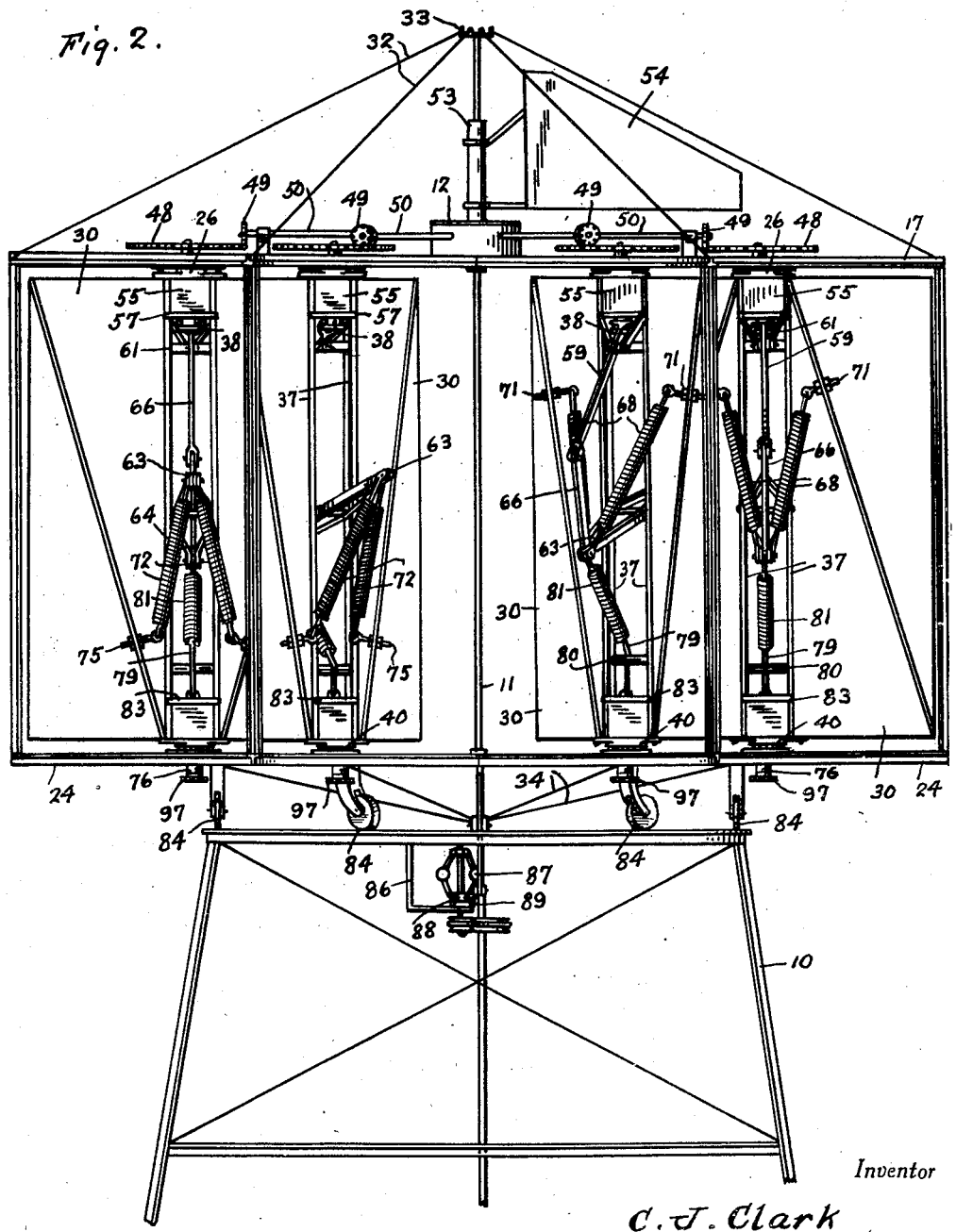
Figure 2 is an elevational view of the mill.

Referring to the drawings more specifically, it will be seen that the numeral 10 indicates a tower of suitable construction. A shaft 11 extends through the tower and above the same.

A gear box 12 is provided with a boss 13 which is fixedly secured to an upper portion of the shaft 11 in any suitable manner and as indicated generally at 14. The gear box 12 is also provided with a removable cap 15 as shown.

On the lower end of the boss 13 is an integral disc 16 to which are riveted or otherwise secured radially extending angle bars 17.

Also fixed on the shaft 11 as at 18 is a hub or disc member 19 to which are riveted or otherwise secured as at 20 one end of angle bars 21.

The bars 21 are arranged in alignment with the bars 17 thus providing a circular series of vertically spaced pairs of bars 17, 21, the bars of each pair being connected together and braced with respect to one another through the medium of vertical brace bars 22.

For each pair of bars 17, 21, there is provided a second pair of bars consisting of an upper angle bar 23 and a lower angle bar 24.

Each bar 23 is connected with its bar 17 by being riveted or otherwise secured at one end as at 25 to a bearing member 26.

Also, each bar 24 is connected with a bar 21 through the medium of a bearing disc 27, bars 24 and 21 being riveted at one end as at 28 to the bearing disc 27 as shown.

At their free outer ends each pair of bars 23, 24 is connected together through the medium of a vertical bar 29.

Thus it will be seen that each assembly of bars 17, 21, 23, 24 and 29 provides a frame structure which accommodates a pair of wings or blades 30.

Also the frame structures, embodying the elements above referred to and which frame structures may be identified, respectively, as a whole by the reference numeral 31 are braced with respect to the upper end of the shaft 11 through the medium of brace wires 32 suitably anchored at one end to the outer upper corners of the frames 31 and at their inner end suitably secured to a plate 33 provided fixedly, on the upper end of the shaft 11.

Also, the members 21 of the frames 31 are braced with respect to the shaft 11 through the medium of brace wires 34 that at one end are secured to the outer ends of the members 21 and their inner ends are suitably secured as at 35 to a plate member 36 suitably fixed on the shaft 11 as clearly shown in Figure 5.

Figure 4:
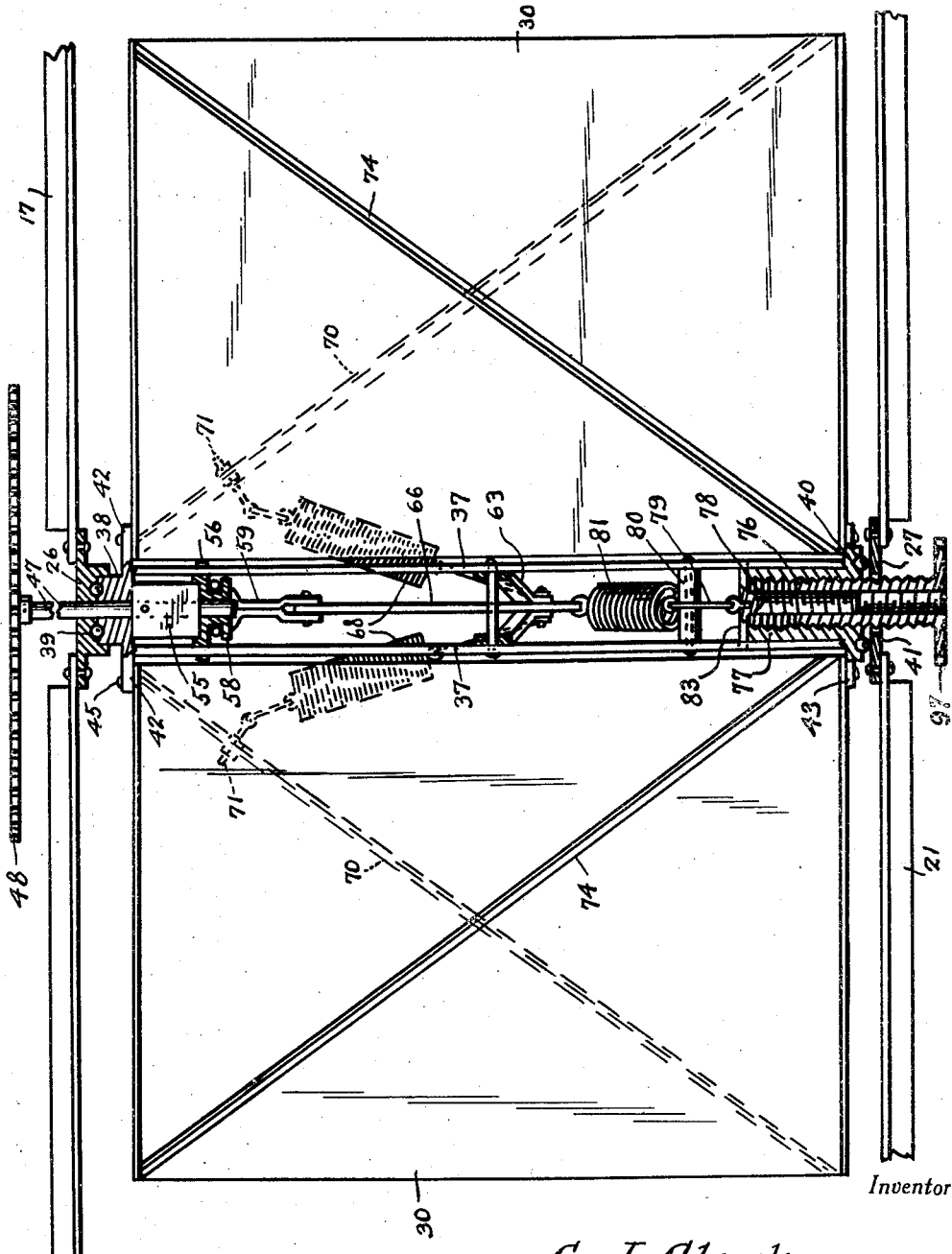
Figure 4 is an enlarged detail view partly in section and partly in elevation showing a wind or blade mounting.

Each windmill blade or wing assembly includes in addition to a pair of blades 30, and as will be best understood from a study of Figures 4, 5 and 6, a pair of vertical side bars 37 which at their upper ends are integral with or otherwise suitably secured to a bearing element 38 complemental to the bearing element 26 to accommodate therebetween ball bearings or the like 39.

Also at their lower ends the side bars 37 are integral with or otherwise secured to a bearing element 40 complemental to the bearing plate 27 to accommodate therebetween ball bearings or the like 41.

The bearing elements 38 and 40 are provided at opposite sides thereof with hinge lugs 42, 43.

Also at their inner vertical edges the blades 30 are formed with integral hinge pin accommodating tubes or eyes 44 that align with the lugs 42, 43 to receive hinge pins 45 through the medium of which the vanes or blades 30 are pivotally associated with the side bars 37 to swing relative thereto.

Journaled in the bearings 26, 38 of each blade or vane assembly is a shaft 47 on the upper end of which is a gear 48.

Each gear 48 is in mesh with a gear 49 on a suitably supported shaft 50 one end of which extends into the housing 12 and is equipped with a gear 51.

As clearly shown in Figure 5, the gears 51 are in mesh with a gear 52 also provided in the housing 12.

Figure 3:
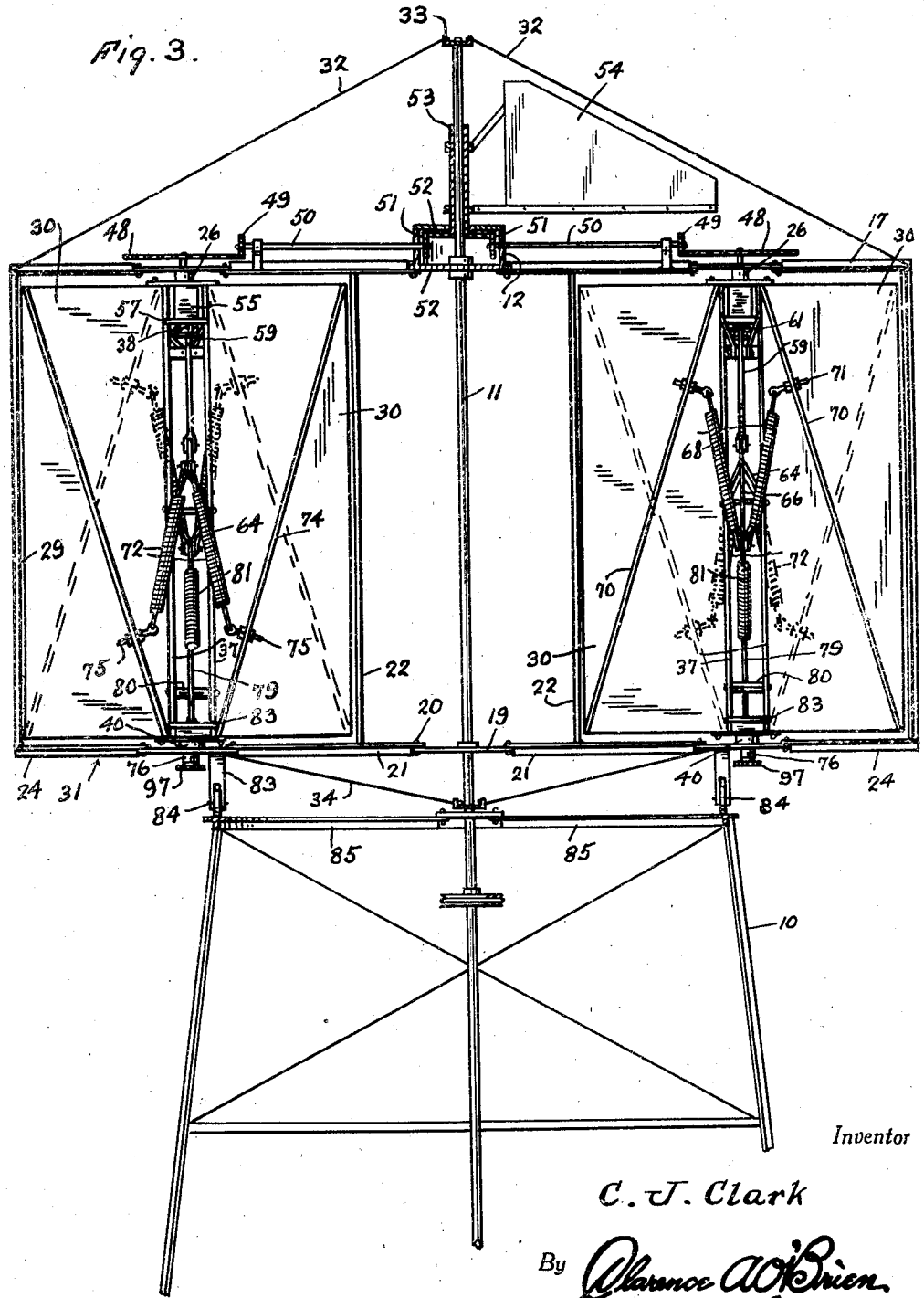
Figure 3 is a vertical sectional view taken substantially on the line 3—3 of Figure 1.

As shown in Figure 3, gear 52 arranged within the housing 12 is provided on the lower end of a sleeve 53 disposed on the shaft 11 and suitably secured to the sleeve 53 in a rigid manner is a vane 54. It will thus be seen that as vane 54 swings in response to the action of the wind thereagainst gear 52 will rotate and the rotation of the gear will be transmitted through the shaftings 50 and the gears 48 to the shafts 47 of the vane assemblies.

Also, for placing the vanes 30 of each assembly into and out of driven engagement with the shaft 47 of said assembly there is provided a suitable clutch structure which includes a fixed, block-like clutch element 55 that is suitably secured to the shaft 47.

Cooperable with the clutch element 55 is a slidable female, clutch element 56 which, as clearly shown in Figure 9 is provided at opposite sides thereof with notches 57 to receive the side bars 37 whereby the clutch element 56 is held against rotative movement relative to the shaft 47.

On the under side thereof the clutch element 56 is provided with a grooved hub portion 58 with which is engaged the prongs of a fork 59.

As best shown in Figure 6, adjacent the pronged end thereof fork 59 is pivotally mounted as at 60 on a suitable bracket structure 61 provided at the upper ends of the bars 37.

Pivoted between the bars 37 as at 62 is a rocker arm 63 which as shown in Figure 4 comprises a pair of complemental strap-like members 64.

Pivoted to the arm 63 between one end of the members 64 as at 65 is a link 66 which is pivoted also to the fork 59 as shown in Figure 6. It will thus be seen that rocking movement of the arm 63 will transmit vertical sliding movement to the clutch element 56 for moving the latter into and out of engagement with the clutch 55 for controlling the placing of the vanes 30 into and out of driven engagement with the shaft 47.

Acting on one end of the arm 63 are a pair of springs 68 which at one end are connected with the arm as at 69 and at a relatively opposite end are connected with diagonal reinforcing members 70 provided for the vanes 30, the springs 68 at said last named ends being connected with the reinforcing elements 70 as at 71. It will thus be seen that springs 68 normally act to cause the arm 63 to swing in a clockwise direction for urging the clutch member 56 out of engagement with the clutch member 55.

A second pair of springs 72 are connected at one end as at 73 with the opposite end of the arm 63, and these springs are anchored at their lower ends to diagonal reinforcing bars 74 provided on the vanes 30 as indicated generally at 75. It will thus be seen that the springs 72 act in conjunction with the spring 68 for normally urging the clutch member 56 downwardly out of engagement with the clutch element 55. For controlling the engagement and disengagement of the clutch element, each wing or blade assembly includes an internally and externally threaded member 76 that is threaded into a sleeve 77 formed integral with the lower bearing member 40. Also threaded into the sleeve 76 is a threaded pin 78 to which is connected as at 79 one end of a flexible element, 79. The element 79 is trained over a sheave 80 supported between the side bars 37 and is connected to one end of a spring 81 that in turn is connected as at 82 with the end of the arm 63 connected through the medium of the link 66 with the fork 59.

The threaded stem 78 is provided with a head 83, opposite end edges of which are notched as at 84 to accommodate the side members 37 in a manner to secure the threaded stem 78 against rotative movement and to constrain the pin 78 to move vertically.

Further, in accordance with the present invention there are provided on the outer ends of the arms 21 brackets 83 in which are journaled supporting rollers 84 that ride on an annular track 85. The annular track 85 as clearly shown in Figure 3 is mounted on the upper end of the tower 10.

Also in accordance with the present invention there is suspended from one of the vane members 21 a bracket 86 which supports a conventional centrifugal governor indicated generally by the reference numeral 87.

The governor 87 includes among other parts the sliding collar 88 which moves in response to the action of the weighted arms of the governor and pivotally connected to the collar 88 is the fork end of a lever 89.

The lever 89 is pivoted as at 90 to a depending lug 91 provided on an arm extending laterally from the track 85 as shown in Figure 5.

Also pivoted on said arm, which arm is indicated by the reference numeral 92 is a rocking lever 93 that at one end is operatively connected with the fork 89 through the medium of a link 94.

On the lever 93 is provided at one end thereof a dog 95 and at a relatively opposite end thereof a dog 96 said dogs rocking with said lever and cooperating with a rack wheel 97 on the lower end of the aforementioned tubular member 76 for turning said member to feed or retract the screw 78 to thereby increase or lessen the tension on the spring 81. Thus it will be seen that when the member 97 is caused to turn in one direction the pin 78 is fed axially therefrom to release the tension on spring 81 so that under action of the spring 68 and 72 arm 63 will rock in a clockwise direction for swinging the lever 59 in a direction to move the clutch member 56 downwardly and out of engagement with the clutch member 55. When, however, the member 76 is caused to rotate in a reverse direction then pin 78 is fed axially inwardly to exert a pull on the spring 81 thus causing the arm 63 to rotate in a counter-clockwise direction in a manner to cause the lever 59 to swing upwardly for forcing the clutch element 56 into engagement with the clutch element 55 so that drive will be transmitted from the shaft 11 to the shafts 47 to cause the blades 30 to revolve.

It will also be appreciated that when the clutch element 56 is disengaged from the clutch element 55 there will be no positive drive transmitted to the blade.

It will also be apparent that the arrangement is such that in a strong wind the blades 30 are free to swing about their hinges 45 to present the edges of the blades to the wind thus preventing damage to the windmill.

I claim:

1. In a windmill, the combination of a tower, a vertical rotatable shaft extending through the tower and above the upper end of the tower, a revoluble structure supported by the tower and connected with said shaft to rotate with the shaft, a plurality of pairs of vanes mounted in the revoluble structure, each pair of vanes including a short shaft mounted in the top of the revoluble structure, a pair of side plates connected together at their upper and lower ends, a bearing between the connected upper ends of said side plates and through which said short shaft extends, the vanes of said pair being hinged at their inner edges to said side plates, clutch means associated with the short shaft and said side plates for placing said side plates in driven engagement with the short shaft for transmitting drive from said short shaft to said vanes, a wind vane mounted on said vertical shaft to rotate about the latter as an axis, driving mechanism connecting the wind vane with the short shafts of the aforementioned respective vane assemblies for driving the latter from the wind vane, and mechanism connected with said vertical shaft and the clutch mechanisms of the respective vane assemblies for engaging and releasing said clutches in reponse to the speed of rotation of said vertical shaft.

2. In a windmill, the combination of a tower, a vertical rotatable shaft extending through the tower and above the upper end of the tower, a revoluble structure supported by the tower and connected with said shaft to rotate with the shaft, a plurality of pairs of vanes mounted in the revoluble structure, each pair of vanes including a short shaft mounted in the top of the revoluble structure, a pair of side plates connected together at their upper and lower ends, a bearing between the connected upper ends of said side plates and through which said short shaft extends, the vanes of said pair being hinged at their inner edges to said side plates, clutch means associated with the short shaft and said side plates for placing said side plates in driven engagement with the short shaft for transmitting drive from said shaft to said vanes, a wind vane mounted on said vertical shaft to rotate about the latter as an axis, driving mechanism connecting the wind vane with the short shafts of the aforementioned respective vane assemblies for driving the latter from the wind vane, and mechanism connected with said vertical shaft and the clutch mechanisms of the respective vane assemblies for engaging and releasing said clutches in response to the speed of rotation of said vertical shaft, said clutch engaging and releasing means including a centrifugal governor embodying a shaft, driving mechanism connecting the governor shaft with said vertical shaft, a member mounted between said side bars at the lower ends of the bars of the respective vane assemblies for axial movement in two directions parallel to said side bars, means operatively connecting said axially movable member with said clutch mechanism, and means controlled by said centrifugal governor for shifting said axially movable member in either of said two directions to engage or release the clutch mechanism.

3. In a windmill, the combination with a tower, a vertical shaft rotatable therein, a frame fixed on said shaft for rotation therewith, a pair of vanes revolubly mounted in said frame, a wind vane freely rotatable about said shaft, means for revolving said pair of vanes under control of said wind vane and including gearing between said wind vane and said pair, cooperating clutch elements between the pair of vanes and said gearing and means for engaging and disengaging said elements including a clutch shifting lever, a pair of tensioning springs tending to urge said lever in opposite directions, respectively, and means for increasing the tension exerted by one of said springs and comprising a governor operative by said shaft, a pull cable, and a feed screw operative by said governor to vary the pull on said cable.

4. In a windmill, the combination with a tower, a vertical shaft rotatable therein, and a frame fixed on said shaft for rotation therewith, of a pair of vanes revolubly mounted in said frame, a wind vane freely rotatable about said shaft, means for revolving said pair of vanes under the control of said wind vane and including gearing between said wind vane and said pair, cooperating clutch elements between the pair of vanes and said gearing, and means for engaging and disengaging said elements including a clutch shifting lever, a pair of tensioning springs tending to urge said lever in opposite directions, respectively, means for increasing the tension exerted by one of said springs and including a governor operative by said shaft, a pull cable, a feed screw on said frame operative to vary the pull on said cable, a toothed wheel on said screw for operating the same, and means to operate said wheel during revolution of said frame and comprising a rocking dog operative by said governor.

CLAUDE J. CLARK.